(12) United States Patent
Beyer et al.

(10) Patent No.: US 6,485,219 B1
(45) Date of Patent: Nov. 26, 2002

(54) GANGING BRACKET FOR A SHELF UNIT

(75) Inventors: Peter J. Beyer, Holland; Tom Dykstra, Zeeland; Mark A. Powell, Grand Haven, all of MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 09/716,720

(22) Filed: Nov. 20, 2000

(51) Int. Cl.[7] .............................................. A47B 57/00
(52) U.S. Cl. ........................ 403/338; 403/340; 108/64
(58) Field of Search ................................ 403/338, 387, 403/389, 33.9, 340, 313; 108/64

(56) References Cited

U.S. PATENT DOCUMENTS

| | | | | |
|---|---|---|---|---|
| 1,953,145 A | * | 4/1934 | Wilson | .................... 403/338 X |
| 4,802,422 A | | 2/1989 | Beard | |
| 5,259,165 A | * | 11/1993 | Koyama | .................. 403/387 X |
| 5,960,601 A | * | 10/1999 | Offutt | ...................... 403/340 X |

* cited by examiner

Primary Examiner—Lynne H. Browne
Assistant Examiner—John R. Cottingham
(74) Attorney, Agent, or Firm—Flynn, Thiel, Boutell & Tanis, P.C.

(57) ABSTRACT

A furniture component arrangement includes a ganging bracket useful for securing a pair of adjacent flanges of adjacent office furniture components in a workstation. The ganging bracket includes ganging parts that are designed for positioning about flanges projecting outwardly from a back wall extending along a length of an office furniture component. The ganging parts each include a male section including a flange slot, a female section forming a female slot, and a vertical offset joining the male section and the female section. The ganging parts also include a substantially identical second ganging part. Each of the ganging parts also includes a channel, aligned with the vertical offset and extending along a portion of the ganging part.

16 Claims, 4 Drawing Sheets

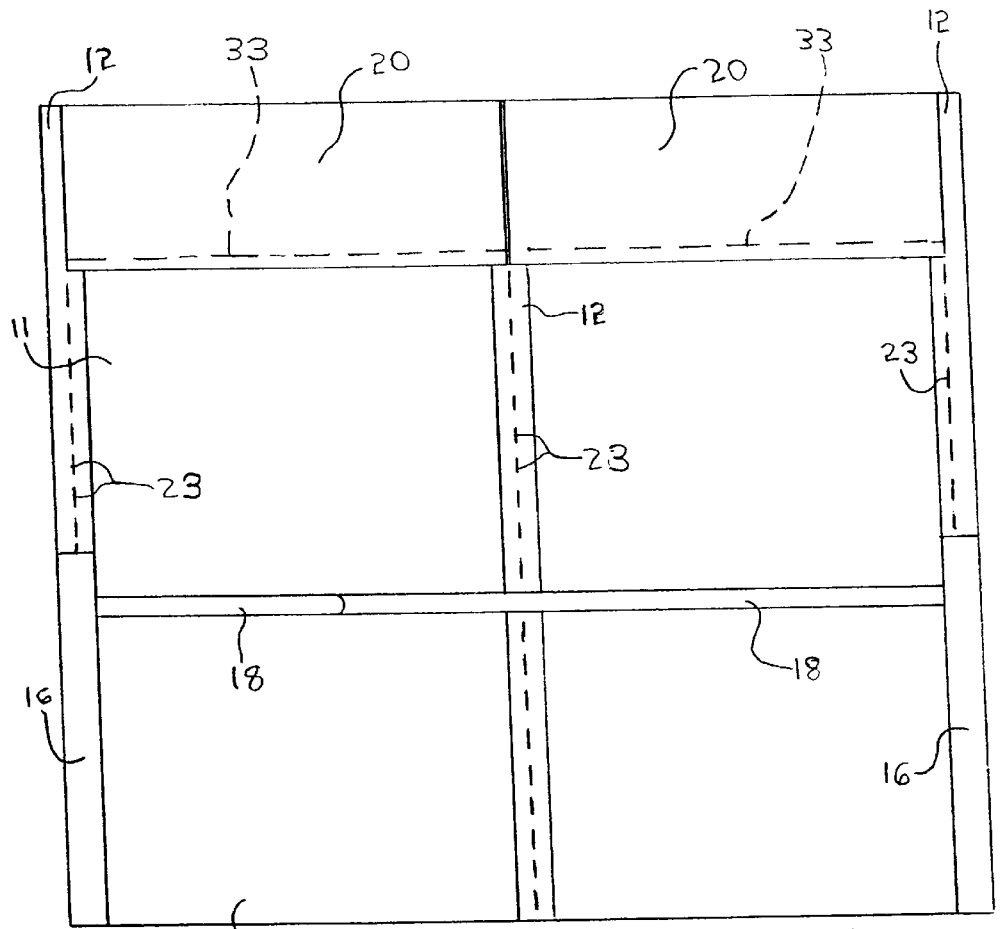
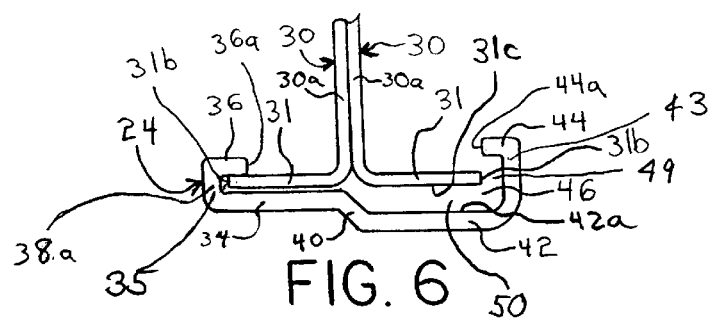

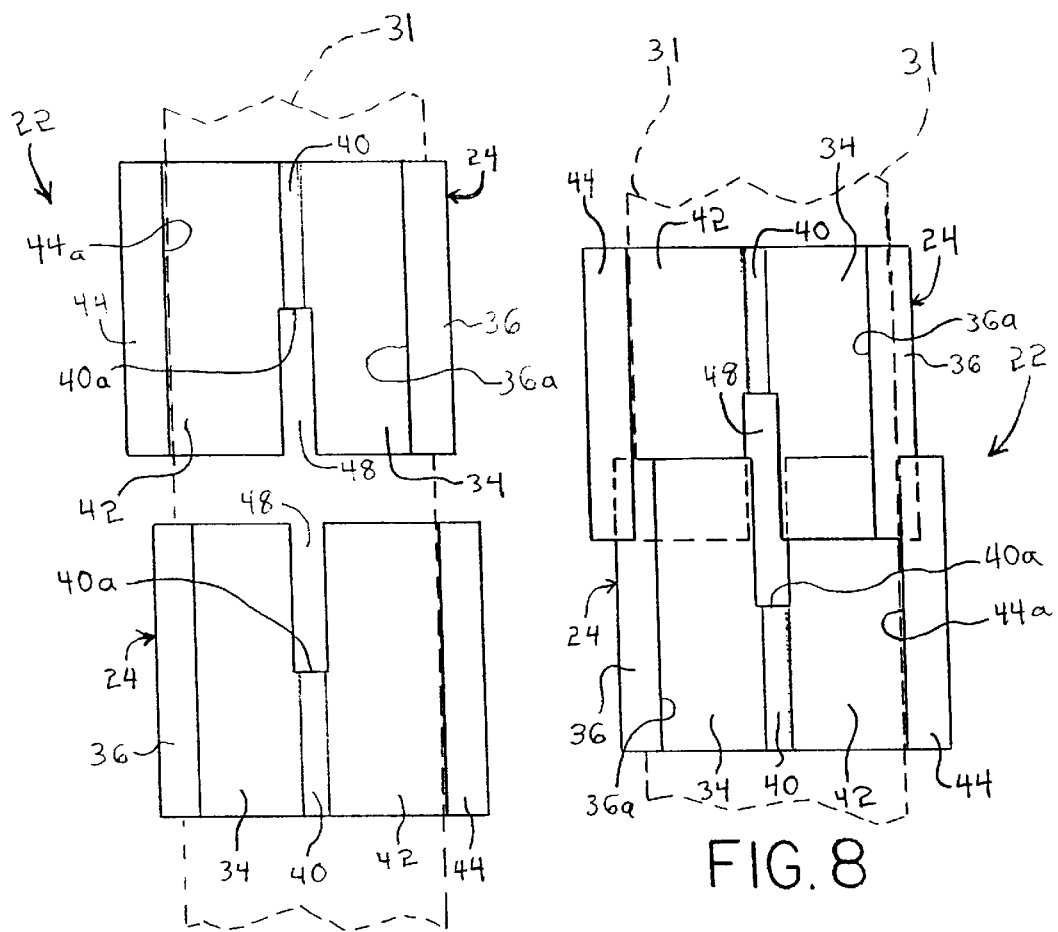
FIG. 7
FIG. 8
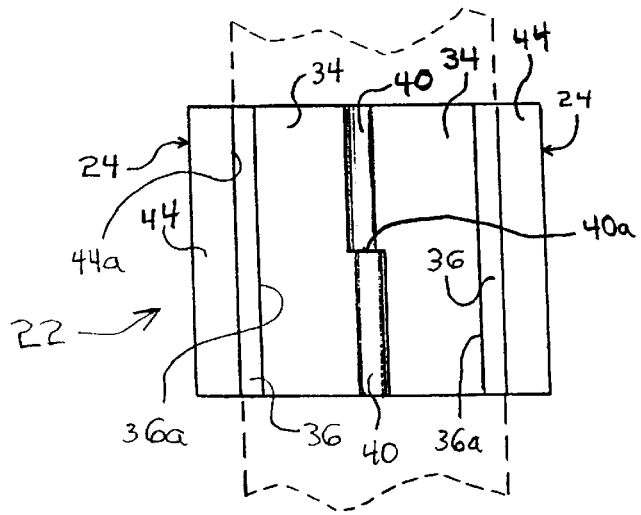
FIG. 9

GANGING BRACKET FOR A SHELF UNIT

FIELD OF THE INVENTION

The invention relates to a ganging bracket for a shelf unit, and more particularly, to a ganging bracket for adjacent overhead storage units mounted on space-dividing wall panels.

BACKGROUND OF THE INVENTION

In open office areas, space-dividing wall panels such as those illustrated in FIG. 1 are used to subdivide relatively large open office areas into individual workstations 10 or workstation areas. One type of wall panel system utilizes vertically enlarged upstanding wall panels 11 which are supported at the opposite ends thereof by vertical posts 12. The wall panels 11 and posts 12 are joined together in end-to-end relation, or in other words are joined serially together to define an upstanding wall. Adjacent ends of the wall panels 11 are supported by a common post to thereby define a central support section and distal ends of the wall panels define end support sections. Wall panel systems of this type are well known, wherein an example is disclosed in U.S. Pat. No. 5,806,258, the disclosure of which is incorporated herein in its entirety by reference.

In the illustrated prior art embodiment of FIG. 1, the wall panels 11 and posts 12 are full-height components, which components are approximately 5 feet high. These components are joined together and define a back wall 14 of the workstation 10. The posts 12 at the opposite ends of the back wall have return walls 16 extending outwardly therefrom to define the opposite sides of the workstation 10. Typically, additional workstation components are supported on the wall panels which components include worksurfaces, shelves, overhead storage cabinets and the like.

To support the components, the posts 12 typically include a vertical row of slots although other mounting arrangements may be used. The workstation components such as the work surface 18 and the storage cabinets or shelves 20 include corresponding hooks, which engage the slots so that these components are supported in load bearing relation by the posts 12.

One disadvantage associated with such wall panel systems occurs when the storage cabinets are heavily loaded. In particular, the adjacent ends of two storage cabinets 20 typically are disposed directly adjacent to each other and are joined to the same post 12 at the central support section. Thus, the loads on the adjacent pair of cabinets 20 are supported close to the top of a single support post 12. At times, the loads may be sufficiently large in the storage cabinets 20 such that the central support section actually deflects forwardly and flexes between the central post and the end posts as generally illustrated in phantom outline in FIG. 1. The posts 12 at the opposite ends of the back wall, however, are each supported by a return wall 16 and only carry the load of a single storage cabinet, and therefore, unlike the central support section, the end posts 12 typically do not flex.

As a result of the deflection of the central support section, the front edges of the storage cabinets 20 may separate from each other such that a gap is created therebetween as diagrammatically illustrated in phantom outline in FIG. 1. This problem also may occur with heavily loaded work surfaces 18. Additionally, this problem may occur in panel-to-panel arrangements wherein a central support section is defined by the adjacent ends of two wall panels and the end support sections are defined by the wall panel ends.

To avoid this problem, it is known to connect the adjacent edges of an adjacent pair of storage cabinets or worksurfaces together by ganging clips. One example of such a ganging clip is disclosed in U.S. Pat. No. 4,802,422, which is used on an adjacent pair of work surfaces. It also is known to use fasteners such as bolts. These prior methods of ganging adjacent furniture components together, however, typically require tools, thus complicating their use and assembly.

In view of the foregoing, it is an object of the invention to provide a ganging clip that overcomes disadvantages of known clips.

The invention relates to an improved ganging bracket that rigidly joins adjacent edges of a pair of storage units or other furniture components together to prevent separation of the front edges thereof under heavy loads. Since separation or spreading of the storage units is effectively prevented, the ganging bracket resists deflection in the area of the central support section and flexing between the central post and the end posts to thereby strengthen the wall panel system.

The ganging bracket of the invention is readily usable with any adjacent pair of storage units having suitable elongate flanges disposed in side-by-side relation. In particular, the ganging bracket is formed of two separate parts that are slipped upwardly over the adjacent flanges so as to be mounted separately in longitudinally spaced relation on the storage units, and then are slid together into mating engagement. This permits the ganging bracket to be assembled and secured in place without the use of tools.

Further, these bracket parts fit tightly together and remain in tight fitting engagement such that the ganging bracket does not loosen over time. Still further, the ganging bracket parts fit together such that opposite sidewalls of each individual bracket part fit tightly against the respective sidewalls of the other bracket part. As a result, the adjacent sidewalls of the bracket parts serve to reinforce each other to more readily resist separation forces, which generally act normal to the bracket side walls, and provide a strong, rigid connection between the adjacent storage units.

Other objects and purposes of the invention, and variations thereof, will be apparent upon reading the following specification and inspecting the accompanying drawings.

BRIEF DESCRIPTION OF THE DRAWINGS

FIG. 3 is a front elevational or forward view of the workstation showing the adjacent storage cabinets secured at top ends of the vertical posts;

FIG. 6 is a front or forward view showing a ganging bracket part receiving the adjacent flanges of the storage cabinets;

FIG. 7 is a top view showing spaced ganging parts with phantom lines representing outer boundaries of adjacent flanges of the storage cabinets;

FIG. 8 is a top view showing the spaced ganging parts in FIG. 7 being joined together in a partially engaged position and including phantom lines illustrating the position of overlapping portions of one ganging part relative to the other ganging part as well as representing the outer boundaries of the adjacent flanges; and FIG. 9 is a top view showing the ganging bracket formed by insertion of the spaced ganging parts of FIG. 8 into each other to a fully engaged position.

Figure 1:
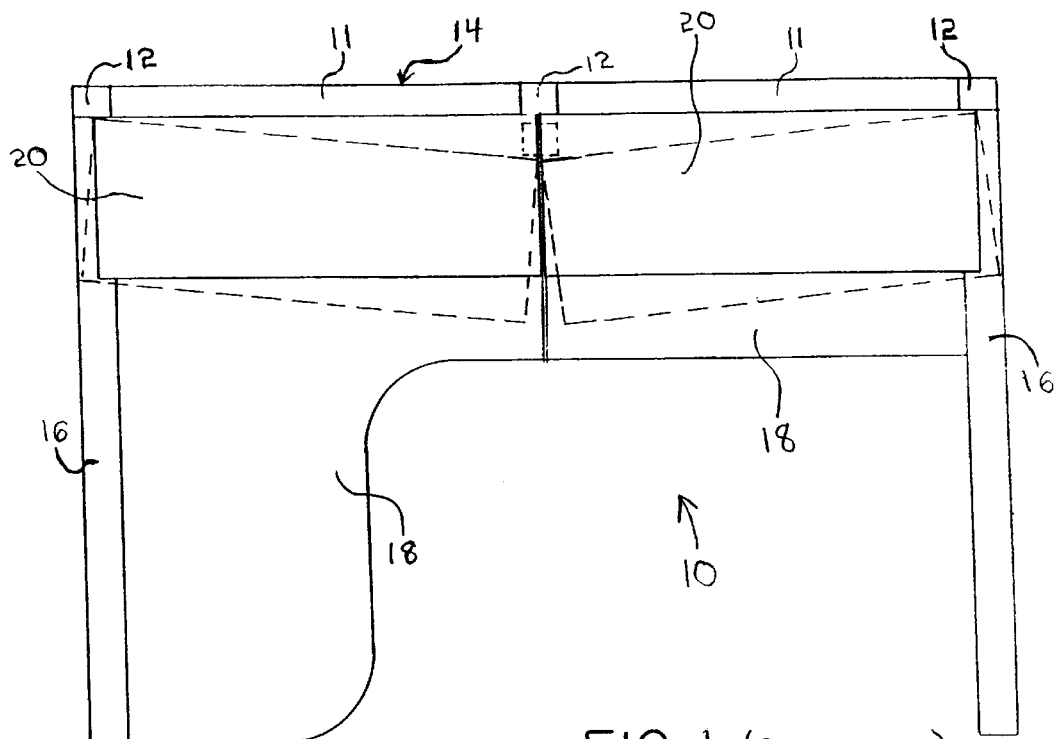
FIG. 1 is a top view of a prior art work station with phantom lines showing bowing of a central post creating a gap between adjacent storage cabinets.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the wall panels of the workstation. Such terminology will include the words specifically mentioned, derivatives thereof, and words of similar import.

DETAILED DESCRIPTION OF THE INVENTION

Figure 2:
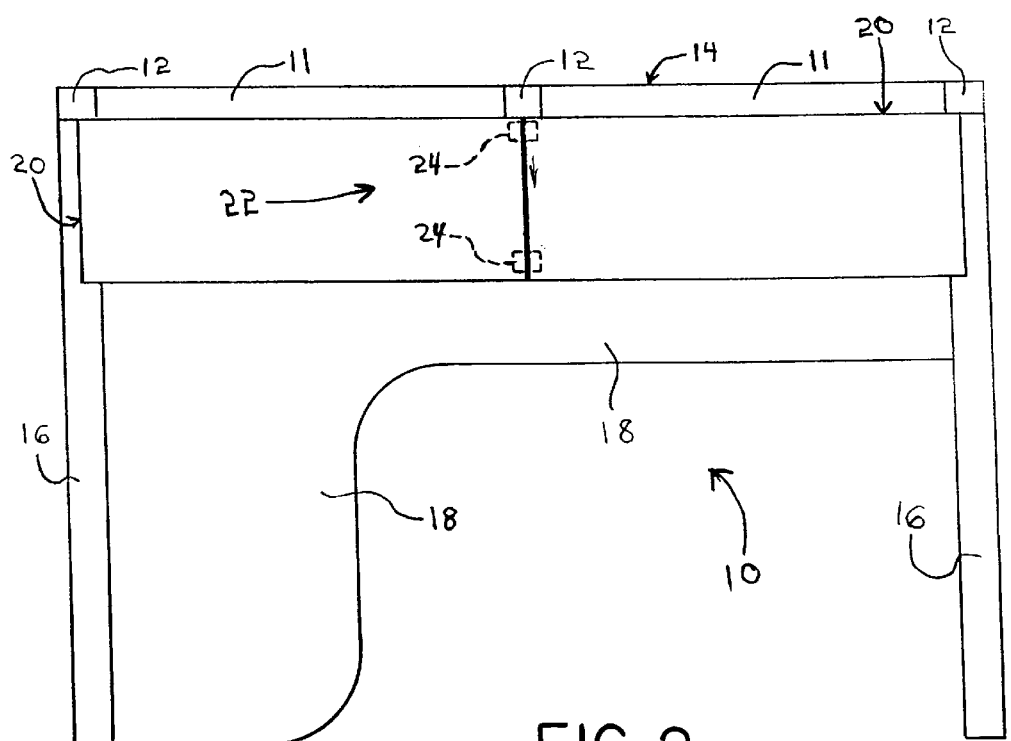
FIG. 2 is a top view of a workstation of the invention during mounting of a ganging bracket of the invention.

Referring to the drawings and specifically FIG. 2, there is illustrated a workstation 10, preferably for use in an office environment. The top view of FIG. 2 shows vertically enlarged wall panels 11 and vertical posts 12 forming a back wall 14. The vertical posts extend upwardly as shown in the front view of FIG. 3 and secure the wall panels 11 together. Thus, back wall 14 is fixedly secured together by joining opposite ends of each wall panel 11 to the laterally spaced apart posts 12 whereby each laterally adjacent pair of panels 11 are supported on a common intermediate post 12 to define a central support section of the wall 14.

Return walls 16 project outwardly from the back wall 14 and provide stability for the workstation 10. In particular, the return walls 16 are rigidly secured to the respective end posts 12 wherein the inner end of each return wall 16 abuts against the opposing front face of the post 12. As such, the end posts 12 are supported by the return walls 16 and the return walls 16 help to prevent tipping of the back wall 14. FIG. 2 is essentially the same workstation as in FIG. 1, except for ganging or connector parts 24 that are used to form a ganging bracket 22, shown in FIG. 5, which will be discussed in detail later.

The front view of FIG. 3 better illustrates the overall workstation arrangement. FIG. 3 shows a sidewardly adjacent pair of storage cabinets 20 spaced vertically above the work surface 18. Each of the vertical posts 12 includes a vertical row of post slots 23 along the vertical length thereof as shown in FIG. 3. The slots 23 receive furniture component hooks 28 from one or more furniture components such as the cabinets 20 shown in FIG. 4.

Figure 4:
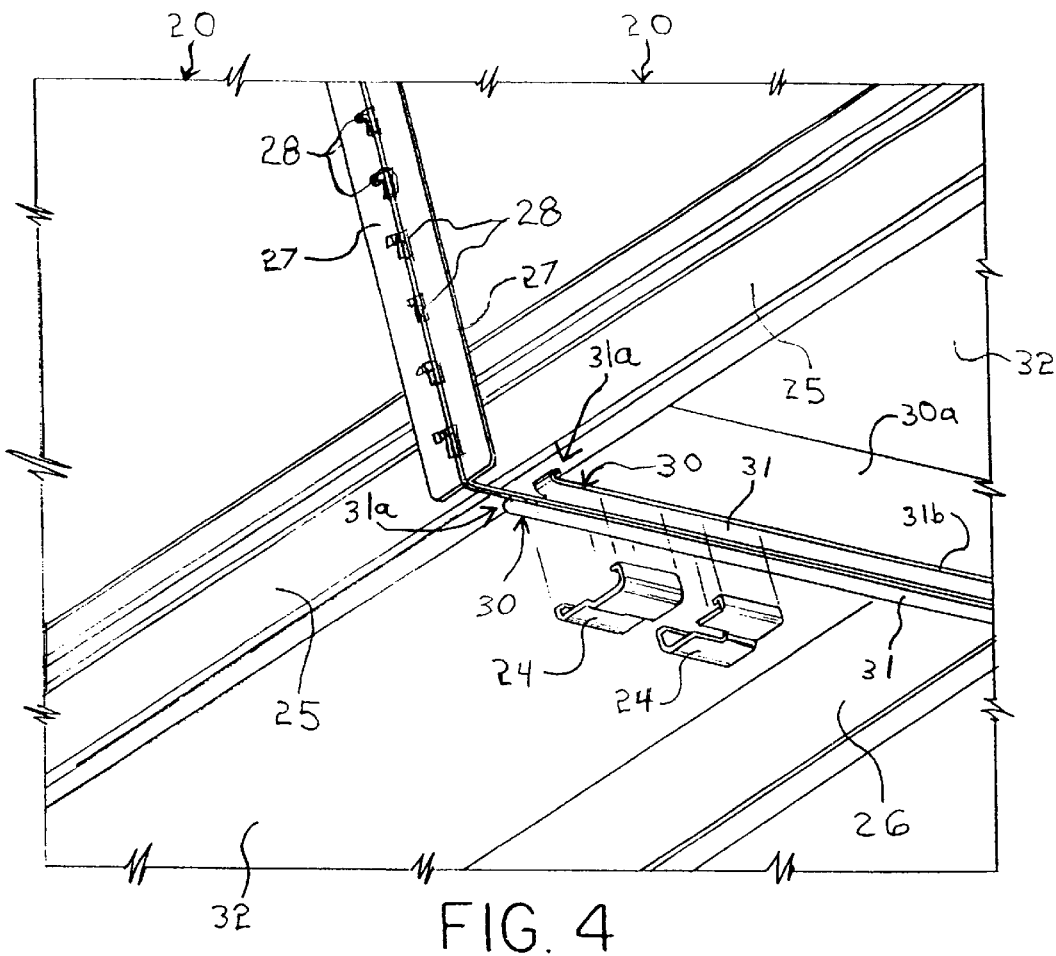
FIG. 4 is a rear perspective view with the end walls and vertical posts of the workstation removed to show how the ganging bracket attaches to flanges of the adjacent storage cabinets.

While the ganging bracket 22 may be used on different storage cabinets, the illustrated storage cabinets 20 each include a frame having a downwardly projecting rear frame rail 25 that extends horizontally along a back edge of the cabinets as shown in FIG. 4. The storage cabinets 20 also include a downwardly projecting front frame rail 26 that is substantially parallel to the rear frame rail 25 and projects downwardly from a front cabinet edge below a bottom panel or shelf 33 as shown in FIG. 4. Vertical rails 27, having furniture component hooks 28 projecting rearwardly therefrom, extend vertically upwardly at side edges of the rear surface of the cabinet 20. FIG. 4 also shows how end flange rails 30 extend forwardly from an end of the rear frame rail 25 to an end of the front rail 26. The end flange rails 30 are positioned below a bottom surface 32 of the shelf 33 of the cabinet 20 at both ends of the cabinet.

The furniture component hooks 28 support storage cabinets 20. Worksurface 18 or other furniture components, can also be secured by additional furniture component hooks 28 onto the vertical posts 12. As shown in FIG. 4, the furniture component hooks 28 can extend the entire vertical length of a back surface of the storage cabinets 20, whereby the hooks 28 are inserted into the rail slots 23 and then shifted downwardly into hooking engagement with the posts 12 for securing the cabinets to the wall 14.

FIG. 4 illustrates the back wall 14 removed. Thus FIG. 4 shows that the end flange rails 30 project outwardly and away from the back wall 14 and along a bottom surface 32 of the storage cabinets 20, the bottom surface 32 being defined by the bottom panel or shelf 33 of the cabinets 20. The end flange rails 30 are an integral part of the frame of the storage cabinets 20, although the flange rails 30 may be separate elements attached thereto to define an add-on mounting location for the ganging bracket 22. The end flange rails 30 each have an inner flange end section adjacent the wall panels and an outer flange end section adjacent an outer side.

The end flange rails 30 also have corresponding, preferably horizontal, flanges 31 acting as flange legs and projecting sidewardly in opposite directions when the end flange rails 30 are adjacent each other. At least the inner end section has a notch 31a in the flange 31, which may be used to mount the ganging bracket as described hereinafter.

More particularly, each flange 31 extends outwardly from a vertical leg 30a (FIG. 6) of the flange rail 30 and terminates at a flange side edge 31b. The side edges 31b are laterally spaced apart to thereby define a lateral width of an adjacent pair of flanges 31.

Figure 5:
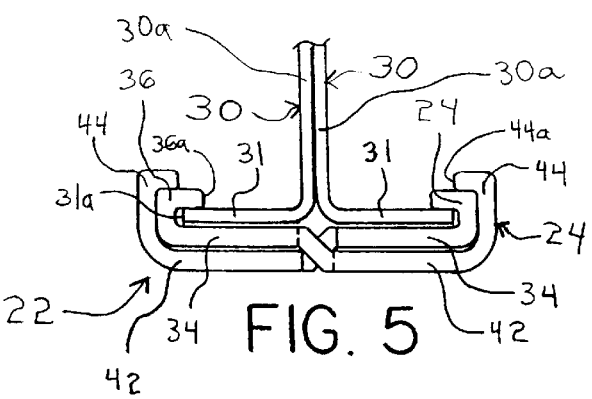
FIG. 5 is an enlarged front or forward view showing the ganging bracket securing adjacent flanges while omitting the bodies of the adjacent storage cabinets for purposes of illustration.

FIGS. 5 and 6 illustrate in detail the structure of the ganging or connecting parts 24, which receive the flanges 31. A single ganging part 24 will be described, as the second ganging part is preferably essentially identical to the first ganging part in all dimensions.

The ganging part 24 shown in FIG. 6 includes a male side section 34 having a curved generally U-shaped end.

More particularly, the male side section 34 comprises an upstanding side wall 35 which projects upwardly and has an inner leg 36 projecting inwardly therefrom. The inner leg 36 terminates at a side edge 36a and at least partially encloses a flange slot 38. More particularly, the slot 38 is defined on the top by the inner leg 36 and on a closed side by the interior face of the side wall 35. The upper face 34a of the male section 34 in part also defines a bottom of the flange slot 38 while the slot 38 has an open side which opens inwardly.

A vertical offset 40 joins the male section 34 with a female section 42. The female section 42 has a curved end forming an outer leg 44. More particularly, the female section 42 comprises an upstanding side wall 43 which projects upwardly and has an inner leg 44 projecting inwardly therefrom. The inner leg 44 terminates at a side edge 44a and at least partially encloses a female slot 46. As shown in FIG. 6, the vertical offset 40 and the greater vertical length of the side wall 43 compared to the side wall 35 provides a greater size to the female slot 46 than the flange slot 38. Specifically, the female slot 46 is adapted to receive the male side section 34 of another ganging part 24 therein when the two ganging parts 24 are joined together. The slots 38, 46, are preferably open on both ends thereof as shown in FIG. 6 to permit longitudinal insertion of one ganging part 24 into another ganging part 24.

The ganging part 24 also includes a horizontal channel 48 as shown in FIG. 7 which extends about half the length of the ganging part 24. The channel 48 is generally aligned with a longitudinal axis of the vertical offset 40. The female section 42 has a greater width than the male section 34. Therefore, the channel 48 is not centered with respect to the overall width of the ganging part 24.

Due to the enlarged size of the female section 42 and the slot 46 thereof, a first clearance space 49 is defined sidewardly between the flange side edge 31b and the side wall 43. Further, due to the vertical offset 40, a second bottom clearance space 50 is defined vertically between the bottom face 31c of the flange 31 and the opposing top surface 42a of the female section 42. Therefore, the female slot 46 of each ganging part 24 can receive the male section 34 of the other ganging part 24 therein. As a result, the opposing flange slots 38 of two mated ganging parts 24 can enclose or confine a pair of adjacent flanges 31 laterally therebetween.

In an alternate embodiment, the slots 38, 46 can be tapered or otherwise formed so that along the length thereof, a portion of the slot adjacent the end of the ganging part 24 at the opening of the channel 48 has greater dimensions than a portion of the slot at an opposing end of the ganging part. This facilitates alignment of the ganging parts 24 when being mated together.

To utilize the ganging bracket 22, storage cabinets 20 or other furniture components, preferably having furniture component hooks 28 are secured in the post slots 23 of vertical posts 12. A central post 12, as shown in FIG. 2, receives component hooks 28 from two adjacent furniture components in the individual post slots 23. Thus a single central post 12, shown in FIG. 2, supports the ends of two adjacent furniture components.

The storage cabinets 20 require lateral support to prevent flexing of the single vertical post 12 and to prevent sideward movement of the storage cabinets as shown in phantom lines in FIG. 1. In this regard, the ganging bracket 22 is used to rigidly join two adjacent frame rails 30 together.

The two ganging parts 24 can be placed onto or about the sidewardly adjacent pair of flanges 31 of the storage cabinets 20, as shown in FIG. 4. This is done by hooking one of the slots 38, 46 on a flange 31 and then swinging the other edge of the ganging part 24 upwardly to the position illustrated in FIG. 6. This is permitted since the distance between the edges 36a and 44a is greater than the lateral width between the flange edges 31b, 31b. While the ganging parts 24 are preferably positioned near the outer end section of the flange 31, the ganging parts 24 can also be moved or slid onto the flanges 31 at the inner end flange section thereof spaced from the back wall 14. The ganging parts 24 are capable of sliding a suitable distance along the length of the adjacent flanges 31 if the ganging parts 24 are slid upwardly into the notches 31a, 31a.

As shown in FIG. 7, when the ganging parts 24 are placed on the flanges 31 (represented by phantom lines), the channels 48 of the ganging parts 24 open toward one another. The channels are in alignment with each other as the ganging parts 24 are moved or slid toward each other in a longitudinal direction along the length of the flanges 31.

As shown in FIG. 8, the legs 44 form the female slots 46 that receive the respective inner leg 36 of the male section 34 which male section 34 in turn receives the respective flange 31. Thus, each of the female slots 46 acts as a male section-receiving slot. The ganging parts 24 slide longitudinally toward one another with portions of the vertical offsets 40 located in the corresponding channels 48 as shown in FIG. 8. The ganging parts 24 are advanced longitudinally toward each other until the closed ends 40a of the vertical offsets 40 contact each other as shown in FIG. 9. The first and second ganging parts 24 thus interlock or mate to form the ganging bracket 22.

When being joined, the ganging parts 24 can move a small distance sidewardly or laterally to enable the ganging parts to lock onto the flanges 31. FIG. 5 better shows how the ganging parts 24 join and spread laterally a short distance to form the ganging bracket 22 with inner edges of the vertical offsets 40 in contact with each other. Further, when the ganging parts 24 are joined, the respective inner leg 36 and the respective flange 31 therein are snugly positioned within the respective outer leg 44 of the corresponding opposing ganging part. Thus sideward movement of furniture components, such as storage cabinets 20, is prevented.

To work most effectively, the ganging bracket 22 preferably is positioned near the outer end section of the flanges 31. Thus, the ganging bracket 22 is located at adjacent cabinet ends near an outward unsupported side of the cabinets 20 and away from the back wall 14.

While the back wall 14 of the preferred embodiment is defined by vertical posts 12 and wall panels 11, other arrangements are also within the scope of the invention. For example, the back wall can be formed by a panel-to-panel arrangement. The panels are each self-supporting and attached to each other at or near the ends thereof. The panels include a set of vertical slots along at least a portion of the vertical length of the panel's frame near each end of the panel. The vertical slots open transversely from a vertical face or plane defined by the panel to receive furniture component hooks 28 as shown in FIG. 4. Other types of panels are also contemplated.

Furthermore, while the ganging bracket 22 is illustrated herein in use on two storage cabinets 20, this ganging bracket 22 can be used on other furniture components having suitable adjacent frame structure which can be engaged by the ganging bracket 22. This ganging bracket 24 also can be used on vertical frame rails.

Still further, the ganging bracket 22 alternately can be constructed without the side wall of the female section whereby two ganging parts 24 can still be mated together by the channels through movement of the ganging parts 24 longitudinally together. Once mated, the flanges 31 are confined laterally or transversely between the male sections 34.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A ganging bracket for use in securing a pair of adjacent flanges of adjacent office furniture components comprising:
    a first ganging part having a male section including a flange slot, a female section forming a female slot, and an offset joining said male section and said female section, and
    a second ganging part having a male section including a flange slot, a female section including a female slot, and an offset joining said male section and said female section,
    wherein said female slots of said respective ganging parts are each capable of snugly receiving the male section of the other of said ganging parts such that said first and second ganging parts are joined to form said ganging bracket, said flange slots having open sides adapted to receive adjacent flanges of adjacent office furniture components and to secure adjacent furniture components together.

2. The ganging bracket of claim 1, wherein said first and second ganging parts are identical.

3. The ganging bracket of claim 1, wherein said flange slots of said respective ganging parts are each capable of snugly receiving a respective flange of a furniture component.

4. The ganging bracket of claim 1, including a first channel extending along a portion of said first ganging part and a second channel extending along a portion of said second ganging part, and wherein said channel of said first ganging part is in alignment with a longitudinal axis of said offset of said first ganging part.

5. The ganging bracket of claim 4, wherein said channel of said second ganging part is in alignment with a longitudinal axis of said offset of said second ganging part and said ganging bracket is formed by aligning said channels of said first and second ganging parts so that said first and second channels open toward one another and by inserting said ganging parts into each other so that said female slots receive said male sections of the other of said ganging parts.

6. The ganging bracket of claim 1, wherein said flange slots and said female slots open sidewardly for sliding receipt of a flange and said male section, respectively, said slots being capable of confining and preventing sideward separation of said first and second flanges while securing adjacent furniture components.

7. In a ganging bracket adapted to be secured to and prevent separation of adjacent flanges of adjacent office furniture components comprising:

first and second ganging parts which are inter-lockable to permit fixed engagement with adjacent edges of office furniture components, each said ganging part having a pair of opposite side walls wherein one of said side walls defines a male section and the other of said side walls defines a female section, each said female section including a female slot adapted to receive said male section of another of said ganging parts, and each said male section including a ganging slot adapted to be engaged with an edge of an office furniture component, said female slot and said ganging slot of each said ganging part extending longitudinally wherein said first and second ganging parts are positionable in opposite orientations with said male section and said female section of one said ganging part being aligned with said female section and said male section respectively of the other said ganging part such that said first and second ganging parts are slidable in said longitudinal direction into engagement with each other wherein said female slot of each said ganging part receives said male section of the other said ganging part in close cooperation therewith, relative movement between said first ganging parts being confined to said longitudinal direction while relative sideward movement of said ganging parts is prevented by said ganging parts such that said ganging slots are fixed in sidewardly spaced relation, said ganging slots adapted to cooperate with office furniture components to prevent relative sideward movement between such office furniture components.

8. The ganging bracket of claim 7, wherein said first and second ganging parts are identical.

9. The ganging bracket of claim 7, wherein each of said ganging parts includes a base wall extending sidewardly between said opposite side walls, each said base wall including an alignment channel extending from a leading edge of said base wall and partially across a longitudinal length of said base wall, said alignment channels of said first and second ganging parts longitudinally interfitting together to permit sliding of one of said ganging parts into the other of said ganging parts while preventing relative sideward movement of said ganging parts.

10. The ganging bracket of claim 9, wherein each said male section extends upwardly from said base wall a lesser distance than said female section but corresponding to said female slot so as to be receivable therein.

11. The ganging bracket of claim 10, wherein said base wall is stepped to define an offset which aligns said male section directly opposite to said female slot of said ganging part which permits longitudinal sliding engagement of said male and female sections of one said ganging part with said female and male sections respectively of the other of said ganging parts.

12. The ganging bracket of claim 11, wherein the offset of each said ganging part is slidable longitudinally into said alignment channel of the other of said ganging parts.

13. The ganging bracket of claim 7, wherein said flange slots of said interlocked ganging parts are disposed in opposing relation a fixed sideward distance from each other.

14. In a ganging bracket adapted to be secured to and prevent separation of adjacent edges of adjacent furniture components comprising:

first and second ganging parts which are longitudinally interlockable, each said ganging part having an engagement section extending longitudinally along one side of said ganging part, each said ganging part further including a base wall extending sidewardly from said engagement part and having an alignment channel extending longitudinally from a leading edge of said base wall and partially across a longitudinal length of said base wall, said first and second ganging parts being positionable in opposite orientations with said alignment channels being longitudinally aligned with each other and interfitted together upon sliding of said ganging parts towards each other, said engagement parts of said first and second ganging parts defining opposite sides of said ganging bracket, said engagement parts being adapted to cooperate with adjacent edges of office furniture components and being spaced from each other at a fixed sideward distance such that engagement of said engagement parts with adjacent edges of furniture components prevents relative sideward movement of the adjacent edges.

15. The ganging bracket of claim 14, wherein said engagement parts include engagement slots which open sidewardly in the direction of said base wall such that said engagement slots when said ganging parts are interfitted together are disposed in opposing relation.

16. The ganging bracket of claim 14, wherein each said ganging part includes a female part disposed on another side of said ganging part opposite to said one side of said ganging part, said female section of one of said ganging parts being adapted to longitudinally receive said engagement part of the other of said ganging parts.

* * * * *